United States Patent [19]

Rasp et al.

[11] Patent Number: 5,314,982
[45] Date of Patent: May 24, 1994

[54] PROCESS FOR THE PREPARATION OF POLYUREA GREASES

[75] Inventors: Christian Rasp, Bergisch Gladbach; Ralf Timmermann; Hermann Perrey, both of Krefeld; Bernhard Lehmann, Aachen; Siegfried Kussi, Leverkusen, all of Fed. Rep. of Germany

[73] Assignee: Bayer AG, Leverkusen, Fed. Rep. of Germany

[21] Appl. No.: 945,867

[22] Filed: Sep. 17, 1992

[30] Foreign Application Priority Data

Sep. 24, 1991 [DE] Fed. Rep. of Germany ....... 4131689

[51] Int. Cl.$^5$ ............................................. C08G 18/08
[52] U.S. Cl. ......................................... 528/48; 528/45; 528/52; 252/25; 252/51.5 A; 252/51.5 R
[58] Field of Search ............... 528/48, 45, 52; 252/25, 252/51.5 A, 51.5 R

[56] References Cited

U.S. PATENT DOCUMENTS

| | | | |
|---|---|---|---|
| 3,154,491 | 10/1964 | Borg et al. | 252/51.5 |
| 3,243,372 | 3/1966 | Dreher et al. | 252/51.5 |
| 3,284,357 | 11/1966 | Koundakjian | 252/51.5 |
| 3,879,305 | 4/1975 | Ehrlich | 252/47.5 |
| 4,100,081 | 7/1978 | Dreher et al. | 252/25 |

FOREIGN PATENT DOCUMENTS

| | | |
|---|---|---|
| 0236022 | 9/1987 | European Pat. Off. |
| 1498356 | 10/1967 | France. |
| 1348176 | 3/1974 | United Kingdom. |

*Primary Examiner*—John Kight, III
*Assistant Examiner*—Duc Truong
*Attorney, Agent, or Firm*—Connolly & Hutz

[57] ABSTRACT

The invention relates to a new three-part process, which can also be employed on a large industrial scale, for the preparation of polyurea lubricating greases, which is characterised (a) in that polyureas which carry oleophilic groups are prepared by reaction of diisocyanates with amines either in the absence of a solvent on a reaction screw at 80°–120° C., preferably at 85°–95° C., (variant A) or in a toluene medium at 20°–80° C., preferably at 30°–60° C., (variant B), (b) in that, after complete reaction, the polyureas prepared according to (a) are ground in the solid, dry state to give powders (at least 70% by weight of the powder having particle sizes of about 100–400μ) and (c) in that the ground crude product, after being made into a "paste" (wetted) at elevated temperature in the base oil employed (10–30 minutes at 140°–180° C.) and cooled again to room temperature, is processed to a grease by complete homogenisation—if appropriate in several passes—in a high-pressure homogeniser under a pressure of 400–1,500 bar (spontaneous heating occurring up to about 100° C.), greases having readily reproducible and essentially the same properties as in the case of the previously customary in situ manufacture being produced.

20 Claims, No Drawings

PROCESS FOR THE PREPARATION OF POLYUREA GREASES

The invention relates to a new process, which can also be employed on a large industrial scale, for the preparation of polyurea lubricating greases which, as is known, can be employed for numerous industrial uses.

Polyurea greases are at present produced in situ by reaction of amines with isocyanates in the base oil. Handling isocyanates causes considerable industrial problems to the grease producers. In spite of the industrial advantages in relation to lubricating greases based on metal soaps, this state of affairs has an adverse effect on more widespread use of polyurea greases. There was thus the object of discovering a route by which the chemical reaction is anticipated and a grease having the same properties as in the case of conventional in situ manufacture can now be produced by the grease producer by dissolving and incorporating a pulverulent polyurea into a base oil.

Industrial lubricating greases are homogeneous products of a semi-liquid to solid consistency. They essentially consist of the dispersion of a thickener in a liquid lubricant (so-called base oil, basic oil or carrier oil), for example a commercially available mineral oil or synthetic oil. The particular typical structure of lubricating greases is determined by the thickener, which is thus of primary importance for the technological properties.

Preparation of a lubricating grease comprises fixing base oils to metal soaps, such as, for example, lithium 12-hydroxystearate soap, or non-soaps, such as organophilic clay minerals or polyurea compounds, all of which are known as suitable thickeners.

The following publications may be referred to in the context of this prior art, document [2] providing a review of the field of polyurea greases:

1] "Manufacture and Application of Lubricating Greases", C. J. Boner, National Lubricating Grease Institute, Kansas City, Reprint 1983, page 677 et seq.
2] "Hochtemperatur-Fette auf der Basis von Polyurea-Gel: Eine Übersicht (High-temperature Greases based on Polyurea Gel: A Review)", W. J. Bartz, Study group for evaluation of lubrication literature, Report No. 10-88, 15.05.1988 (ISSN 0342-4288/1107), and other literature references,
3] "High Temperature Greases based on Polyurea Gellants: A Review", P. S. Venkataramani, Journal of Synthetic Lubrication 1987 Volume 4, No. 3, pages 229–244.
4] "Lubricating Grease Guide", National Lubricating Grease Institute, Kansas City, First Edition 1984, Revised 1987, pages 1.13, 1.14, 2.16, 4.12, 4.13 (ISBN-0-9613935-1-3).
[5] DE-B-1,284,554
[6] DE-A-2,604,343
[7] US-A-4,129,512
[8] EP-A-0,233,757
[9] EP-A-0,236,022

The process parameters, such as heating-up curve, final temperature, cooling curve, stirring speed, concentration ratios and nature and intensity of the homogenisation have a decisive effect here on the mechanico-dynamic and physical properties of the grease. The discontinuous preparation process is still the most widely used today and comprises the following process steps:

Reaction phase: open kettle or heatable autoclave

Structuring phase: stirrers which can be heated and cooled (formation of the network in the thickener and adding on of the base oils)

Mechanical phase: addition of active compounds, homogenisation, deaeration.

Non-soap greases based on organic thickeners (for example polyureas) have, because of their thickening system, a high heat resistance and excellent mechanico-dynamic properties. They are used for lubricating high-speed bearings and gears at temperatures above 150° C. and for operating times of more than 500 hours.

They are significantly superior in performance to the conventional lithium multipurpose greases, but to date have not become widely accepted for reasons of cost, production and availability.

The rheological properties of polyurea lubricating greases differ from those of conventional metal soaps. The reason for this is given as the fact that the network formed is stabilised not only by secondary valencies and physical forces, but also by chemical bridge bonding. The aromatic molecular groups are moreover capable of converting the incorporated mechanical energy (atom vibrations into electron vibration; mesomerism effects).

Equation of polyurea formation from diisocyanate and amines (compare G. Schmidt: "Gel-, Bentonit- und Polyharnstoff-Schmierfette [Gel, Bentonite and Polyurea Lubricating Greases]", Tribologie und Schmierungstechnik Volume 31 (6), 1984, pages 309–314)

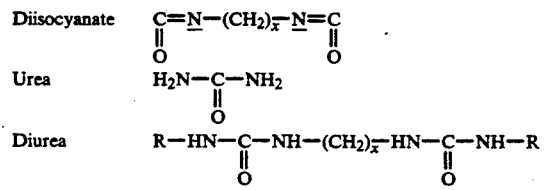

Diisocyanate  O=C=N—(CH$_2$)$_x$—N=C=O
Urea  H$_2$N—CO—NH$_2$
Diurea  R—HN—CO—NH—(CH$_2$)$_x$—HN—CO—NH—R (x = 4–8; R = C$_{6-22}$-Alkyl)

1 diisocyanate
.2 RNH$_2$

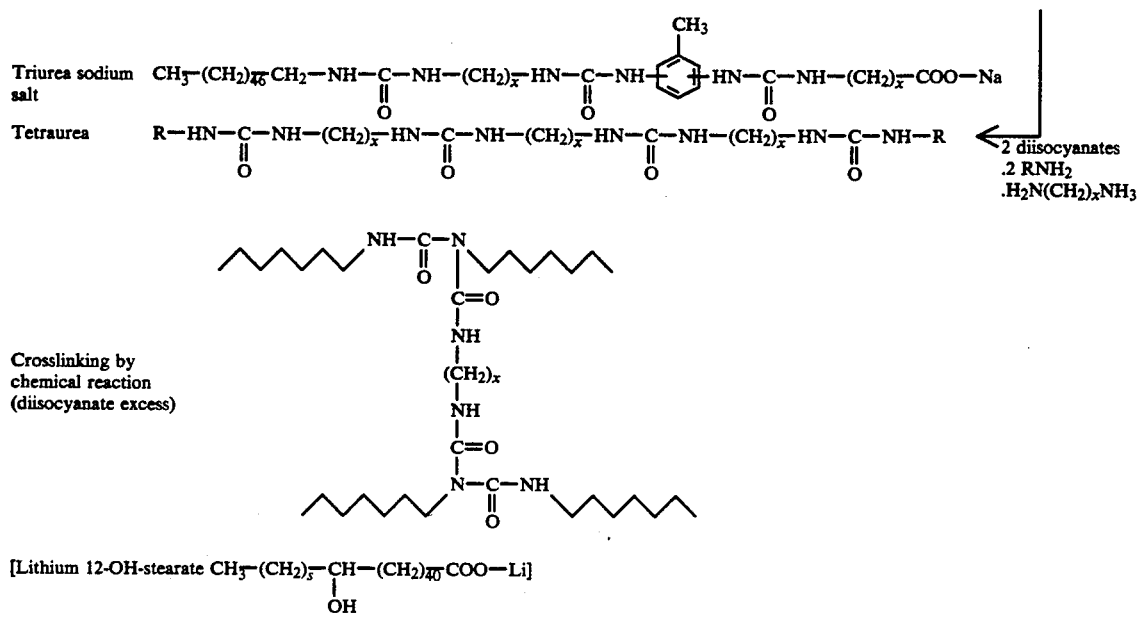

The polyurea thickening component is as a rule prepared in the base oil in situ by equimolecular reaction of aromatic diisocyanates with mono- and/or difunctional aryl- or alkylamines. Diisocyanates (MDI methylenebis(phenyl isocyanate)=4,4'-diisocyanatodiphenylmethane; TDI=toluylene diisocyanate) are classified as hazardous working substances because of their particular reactivity and must be handled with particular caution. MDI and TDI are sensitive to heat because of their tendency to dimerise.

These circumstances limit the number of possible polyurea lubricating grease production plants and necessitate exact control of raw material delivery, stockholding and grease production.

To bypass these difficulties, the following route can in principle also be taken for the preparation of polyurea greases: incorporation of separately prepared polyureas into the base oil (compare Document [2]).

However, this has so far been only moderately satisfactory on a laboratory scale; above all, a very loose, extremely fine grain ($<50\mu$) of polyurea must be mixed into the base oil. Although preparation of this fine grain is industrially possible, it is very involved, expensive and poorly reproducible.

A process for preparation of grease in accordance with this principle—that is to say by dispersing previously produced polyurea in the base oil—which can also be employed on an industrial scale has not been known to date.

It has now been found, surprisingly, that the desired polyurea greases can also be prepared on an industrial scale by a three-part process, wherein
  (a) polyureas which carry oleophilic groups are prepared by reaction of diisocyanates with amines either in the absence of a solvent on a reaction screw at 80°-120° C., preferably at 85°-95° C., (variant A) or in a toluene medium at 20°-80° C., preferably at 30°-60° C., (variant B),
  (b) after complete reaction, the polyureas prepared according to (a) are ground in the solid, dry state to give powders (at least 70% by weight of the powder having particle sizes of about 100-400$\mu$) and
  (c) the ground crude product (i.e., the polyurea powder), after being made into a "paste" (wetted) by adding a liquid lubricant to the polyurea powder to form a mixture and raising the temperature of the mixture to an elevated temperature e.g., 10-30 minutes at 140°-180° C.) and then coating the mixture to room temperature, is processed to a grease by complete homogenisation—if appropriate in several passes—in a high-pressure homogeniser under a pressure of 400-1,500 bar (spontaneous heating occurring up to about 100° C.), greases having readily reproducible and essentially the same properties as in the case of the previously customary in situ manufacture being produced.

"Oleophilic groups" here are to be understood as meaning essentially alkyl groups having 6-22 carbon atoms.

Starting substances which are employed as the diisocyanates for the polyurea preparation according to step (a) are preferably toluylene diisocyanate (TDI) and methylenebis(phenyl isocyanate) (=4,4'-diisocyanatodiphenylmethane) (MDI).

Both primary aliphatic or aromatic monoamines and also diamines are employed as the amines, stearylamine (StA) and hexylamine (HA) preferably as the monoamines and hexamethylenediamine (HMDA) or 4,4'-diamino-diphenylmethane (MDA) preferably as the diamines.

The components are in general reacted in stoichiometric proportions (see Examples section).

Thus, for example, a polyurea having the (statistical) composition

StA-TDI-HMDA-TDI-StA with 4 urea groups and a molecular weight of 1002 g/mol is obtained by reaction of 1 mol (116 g) of hexamethylenediamine with 2 mol (2×174 g) of toluylene diisocyanate and 2 mol (2×269 g) of stearylamine (=PU-1 according to Example 1).

It is important in all cases that the polyurea formation is complete at the end of process step (a), that is to say that the reaction masses have reacted completely, since only in this way can the degree of crosslinking required in the polyurea (by so-called filament formation) to obtain a good fat consistency be achieved and guaranteed.

Further details on variants A and B according to process step (a) are described in the following Examples section.

The polyureas obtained in process step (a) are ground to powders according to step (b), a powder grain of 100–400μ particle size being completely adequate and additional fine grinding and expensive sieving-out being dispensed with.

The polyurea powder thus obtained can be dispersed in the base oil in the particular desired concentrations according to step (c) (made into a "paste", wetted) and is heated at about 170° C. together with the base oil in an open stirred apparatus for about 15 minutes and then cooled, while stirring. The concentration of the polyurea in the base oil is in general in the range of about 5–15% by weight, preferably 6–12% by weight.

The base oils used are, as mentioned above, commercially available mineral oils or—optionally modified—synthetic oils, in particular poly-α-olefins, and furthermore also naturally occurring and synthetic polyesters, polyethers or polyether-esters (compare the Examples section).

Finally, the pre-dispersed powder which has been made into a "paste" is treated, after being cooled to room temperature, under various pressures in a high-pressure homogeniser—which in principle is similar to a diesel injection pump and is capable of comminuting a suspended fine grain to a high degree in the injection gap—if appropriate in several passes—in most cases 2 passes are sufficient—the precursors finally acquiring the typical grease consistency.

Further details on process steps (b) and (c) are likewise described in the Examples section.

The process according to the invention for the first time also allows fat producers who have no concession to "work with isocyanates" to carry out—isocyanate-free—preparation of polyurea greases from polyurea powders, obtained from chemical producers, by step (c) of the process according to the invention, these lubricating greases having the same quality as the polyurea greases prepared by means of the in situ technique previously employed.

As mentioned above, polyurea greases are employed for numerous industrial uses. These include paper machines, mining equipment, motor vehicles, roller bearings in deep-drawing of metal and lubricating operations in sintered metal technology (compare, for example, document [2]).

EXAMPLES

I) General information on process step (a)—Variant A

The following conditions were chosen for solvent-free preparation of polyurea powders on a (twin-action) reaction screw:

| | |
|---|---|
| screw length: | 50 cm |
| screw heating | |
| internal heating: | 70° C. |
| jacket heating: | 80° C. |
| screw speed: | 6 revolutions/minute |

-continued

The following conditions were chosen for solvent-free preparation of polyurea powders on a (twin-action) reaction screw:

| | |
|---|---|
| resulting residence time of the product: | about 2 minutes |
| delivery: | about 2 kg/hour |

The safety measures which apply to working with amines and isocyanates are of course to be strictly observed here.

When the starting substances are passed through the reaction screw, thorough mixing of the diisocyanate and amine component is guaranteed, with rapid formation of a prepolymer, which, after leaving the screw, reacts completely by a slow after-reaction with gradual cooling (1-2 hours) to form a finished polyurea which forms stiff masses (lumps) and is subsequently ground to a powder.

II) General information on process step (a)—Variant B

To prepare polyurea powders in a toluene medium, the individual starting substances are initially dissolved to give in each case 10% strength solutions in toluene. The isocyanate-toluene solution was initially introduced into the reaction vessel. The amines were dissolved in toluene at the same time, while heating to about 50° C. When the amine mixture had dissolved to give a clear solution, it was slowly introduced into the isocyanate-toluene solution, while stirring.

To guarantee uniform thorough mixing, the stirring speed must be increased stepwise, since the reaction product thickens to a gelatinous consistency (it is possible to add toluene to improve the mixing).

Furthermore, the "toluene medium" to be used here can also contain, alongside toluene, other aprotic polar solvents as additional diluents or reaction auxiliaries, preferably from the group comprising cyclic ethers, such as, for example, tetrahydrofuran, and tertiary amines (for example ®DESMORAPID, which catalyses the addition of amines onto isocyanates)].

After a stirring time of 15 minutes, the solvent was distilled off on a rotary evaporator under a waterpump vacuum at a bath temperature of 80° C.

The product was then dried overnight on enamel sheets in a drying cabinet at 50°–60° C.

III) General information on process steps (b) and (c):

The thoroughly dried and completely reacted polyurea (crude) products obtained according to variants A and B of process step (a) were further treated as follows for making into a "paste" and subsequent homogenisation:

The crude products were ground once by means of a suitable mill (for example a commercially available STARMIX unit for 100 g amounts) to give a powder (having particle sizes of customary STARMIX quality; 1 minute/level 3); sieves are dispensed with.

The polyurea powders obtained in this manner were then dispersed in the base oil in various concentrations and the dispersions were heated at about 170° C. in a stirred apparatus for 15 minutes and cooled, while stirring.

The polyurea powders made into a "paste" (dispersed) in this manner were then after-treated in a high-pressure homogeniser under various pressures, in some cases in 2 or more passes.

The APV homogeniser "MICRON LAB 40" from APV Gaulin, Lübeck, was used. This apparatus allows operation in the pressure range of 400–1,500 bar, the customary operating pressure being 700 bar; 2 homogenisations are advisable under this optimum pressure in order to achieve a good grease consistency.

IV) Chemical build-up of the thickeners employed

Example 1 [PU=polyurea]

The following polyurea having 4 urea groups was prepared according to process step (a)/variant A and variant B, the same results being obtained, that is to say products having the same composition and properties, being obtained in both cases:

| StA - TDI - HMDA - TDI - StA [PU-1] | | |
|---|---|---|
| Toluylene diisocyanate (Desmodur T 80) | (TDI) | 2 mol at 174 g = 348 g corresponding to 34.7% |
| Hexamethylenediamine | (HMDA) | 1 mol at 116 g = 116 g corresponding to 11.6% |
| Stearylamine | (StA) | 2 mol at 269 g = 538 g corresponding to 53.7% |
| Molecular weight = 1002 g corresponding to 100% | | |

Example 2

The following polyurea having 6 urea group [PU 2] was prepared according to process step (a)/variant B:

| StA - TDI - HMDA - TDI - HMDA - TDI - StA [PU-2] | | |
|---|---|---|
| Toluylene diisocyanate (Desmodur T 80) | (TDI) | 3 mol at 174 g = 522 g corresponding to 41.6% |
| Hexamethylenediamine | (HMDA) | 2 mol at 116 g = 232 g corresponding to 18.0% |
| Stearylamine | (StA) | 2 mol at 269 g = 538 g corresponding to 41.6% |

-continued

| StA - TDI - HMDA - TDI - HMDA - TDI - StA [PU-2] |
|---|
| Molecular weight = 1292 g corresponding to 100% |

Example 3

The following polyurea having 4 urea groups [PU-3] was prepared according to process step (a)/variant B:

| HA - TDI - HMDA - TDI - HA [PU-3] | | |
|---|---|---|
| Toluylene diisocyanate (Desmodur T 80) | (TDI) | 2 mol at 174 g = 348 g corresponding to 44.5% |
| Hexamethylenediamine | (HMDA) | 1 mol at 116 g = 116 g corresponding to 29.7% |
| Hexylamine | (HA) | 2 mol at 101 g = 202 g corresponding to 25.8% |
| Molecular weight = 666 g corresponding to 100% | | |

V) The greases prepared from these polyureas and their typical properties—in comparison with two commercial products—are summarised in the following Table 1:

TABLE I

POLYUREA GREASES

| Polyurea grease [PU-G] Example No. | Thickener Polyurea [PU] See -IV- | Content in base oil [% by weight] | Base oil carrier oil[1] | Static penetration[2] [0.1 mm] | Worked penetration 60 DS[3] [0.1 mm] | W/S[4] | Dropping point[5] [°C.] |
|---|---|---|---|---|---|---|---|
| a) [PU-G] commercial product: | | | | | | | |
| "PETAMO GHY 441" (Klüber Lubrication München KG) | | | Ester/PAO | 265 | 325 | 1.23 | >250 |
| "URETHYN E2" (Reiner Chemie, Weilerbach) | | | — | 189 | 235 | 1.24 | 273 |
| b) Invention: | | | | | | | |
| PU-G 1 | PU-1 | 7.5 | ISO 100 | 324 | 328 | 1.01 | 209 |
| PU-G 2 | PU-1 | 8.5 | ISO 100 | 290 | 326 | 1.12 | 230 |
| PU-G 3 | PU-1 | 6.0 | PAO (ISO 100) | 303 | 348 | 1.15 | 232 |
| PU-G 4 | PU-1 | 7.5 | PAO (ISO 100) | 280 | 326 | 1.16 | 230 |
| PU-G 5 | PU-1 | 9.0 | PAO (ISO 100) | 252 | 274 | 1.09 | 242 |
| PU-G 6 | PU-1 + PU-2 | 5.0 + 5.0 | ISO 100 | 347 | 365 | 1.05 | 235 |
| PU-G 7 | PU-1 + PU-2 | 6.0 + 6.0 | ISO 100 | 289 | 328 | 1.13 | 244 |
| PU-G 8 | PU-1 + PU-3 | 5.0 + 5.0 | PAO (ISO 100) | 290 | 320 | 1.10 | 243 |

Notes on Table I
[1] Base oil/carrier oil:
"ISO 100": a naphthene-based solvent raffinate of certain viscosity
"PAO (ISO 100)": a poly-α-olefin of certain viscosity
[2] Test method: DIN 51804/1
[3] Test method: DIN 51804/1 (DS = double strokes)
[4] W/S = ratio of worked penetration 60 DS[3] to static penetration[2]
[5] Test method: DIN 51801/1

It will be understood that the instant specification and claims ar set froth by way of illustration and not limitation, and that various modifications and changes may be made without departing from the spirit and scope of the present invention.

What is claimed is:

1. Process for the preparation of polyurea greases, wherein
    (a) polyureas which carry oleophilic groups are prepared by reaction of diisocyanates with amines either in the absence of a solvent at 80°–120° C. (variant A) or in a toluene medium at 20°–80° C. (variant B),
    (b) after complete reaction, the polyureas prepared according to (a) are ground in the solid, dry state to powder form (at least 70% of the powder having particle sizes of about 100–400μ) and (c) the powder, after being made into a paste by adding a liquid lubricant to the powder to form a mixture and raising the temperature of the mixture to 140°–180° C. and then cooling the mixture to room temperature, is processed to a grease by complete homogenisation under a pressure of 400–1,500 bar.

2. Process according to claim 1, wherein the reaction according to (a) is carried out in the absence of a solvent at 85°–95° C. or in a toluene medium at 30°–60° C.

3. Process according to claim 1, wherein the pressure in (c) is 650–750 bar.

4. Process according to claim 1, wherein the concentration of the polyurea powder in the liquid lubricant in (c) is in the range of about 5–15% by weight.

5. Process according to claim 1, wherein in (a), variant A or B, a polyurea having the (statistical) composition StA-TDI-HMDA-TDI-StA with 4 urea groups and a molecular weight of 1002 g/mol is prepared by reaction of toluylene diisocyanate (TDI) with hexamethylenediamine (HMDA) and stearylamine (StA) in a molar ratio of 2:1:2.

6. Process according to claim 1, wherein the polyureas according to (a) are prepared by reaction of diisocyanates with amines in the absence of a solvent in a screw extruder at 80°–120° C.

7. Process according to claim 1, wherein the elevated temperature in (c) is from 140°–180° C.

8. Process according to claim 1, wherein the powder is processed to the grease by complete homogenisation in a high-pressure homogeniser under a pressure of 400–1,500 bar.

9. Process according to claim 8, wherein the powder is processed to the grease by several passes through said high-pressure homogeniser until said complete homogenisation is achieved.

10. Process according to claim 4, wherein the concentration of the polyurea powder in the liquid lubricant in (c) is in the range of about 6–12% by weight.

11. Process according to claim 1, wherein the diisocyanates in (a) are selected from the group consisting of toluylene diisocyanate (TDI) and methylenebis(phenyl isocyanate) (MDI).

12. Process according to claim 1, wherein the amines in (a) are selected from primary aliphatic or aromatic monoamines and diamines.

13. Process according to claim 12, wherein the amines are selected from stearylamine (StA), hexylamine (HA), hexamethylenediamine (HMDA) and 4,4′-diamino-diphenylmethane (MDA).

14. Process according to claim 1, wherein in (c) the paste is formed by first dispersing the polyurea powder in the liquid lubricant to form a mixture and then raising the temperature of the mixture to 140°–180° C. and stirring the mixture for 10–30 minutes at 140°–180° C. before cooling the mixture to room temperature while stirring.

15. Process according to claim 1, wherein the liquid lubricant is selected from the group consisting of mineral oils, synthetic oils, polyesters, polyethers and polyetheresters.

16. Process according to claim 15, wherein the liquid lubricant is a synthetic oil which includes poly-α-olefins.

17. Process according to claim 1, wherein in (a), variant B, a polyurea having the (statistical) composition StA-TDI-HMDA-TDI-HMDA-TDI-StA with 6 urea groups and a molecular weight of 1292 g/mol is prepared by reaction of toluylene diisocyanate (TDI) with hexamethylenediamine (HMDA) and stearylamine (StA) in a molar ratio of 3:2:2.

18. Process according to claim 1, wherein in (a), variant B, a polyurea having the (statistical) composition HA-TDI-HMDA-TDI-HA with 4 urea groups and a molecular weight of 666 g/mol is prepared by reaction of toluylene diisocyanate (TDI) with hexamethylenediamine (HMDA) and hexylamine (HA) in a molar ratio of 2:1:2.

19. Process for the preparation of polyurea greases, wherein said process consists essentially of the following steps in the following order:
  (i) reacting diisocyanates with amines either in the absence of a solvent at 80°–120° C. (variant A) or in a toluene medium at 20°–80° C. (variant B) to form polyureas which carry oleophilic groups, said reacting being carried out until said diisocyanates and said amines have reacted completely to form said polyureas;
  (ii) grinding said polyureas from step (i) in the solid, dry state to powder form wherein at least 70% of the powder has particle sizes of about 100–400μ;
  (iii) mixing said polyurea powder from step (ii) with a liquid lubricant to form a mixture;
  (iv) heating said mixture from step (iii) to 140°–180° C.;
  (v) cooling said mixture from step (iv) to room temperature;
  (vi) processing said mixture from step (v) to a grease by complete homogenization under a pressure of 400–1,500 bar.

20. The process of claim 19, wherein said liquid lubricant is mineral oil or synthetic oil.

* * * * *